US012671122B2

(12) United States Patent
Son et al.

(10) Patent No.: US 12,671,122 B2
(45) Date of Patent: Jun. 30, 2026

(54) FLUIDIZED BED REACTOR AND METHOD FOR RECOVERING ACTIVE METAL OF LITHIUM SECONDARY BATTERY USING SAME

(71) Applicant: SK INNOVATION CO., LTD., Seoul (KR)

(72) Inventors: Sung Real Son, Daejeon (KR); Haeng Goo Kang, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 894 days.

(21) Appl. No.: 17/889,608

(22) Filed: Aug. 17, 2022

(65) Prior Publication Data

US 2022/0407133 A1     Dec. 22, 2022

Related U.S. Application Data

(63) Continuation     of     application     No. PCT/KR2021/002027, filed on Feb. 17, 2021.

(51) Int. Cl.
| | |
|---|---|
| *H01M 10/54* | (2006.01) |
| *C22B 7/00* | (2006.01) |
| *C22B 26/12* | (2006.01) |

(52) U.S. Cl.
CPC ............. *H01M 10/54* (2013.01); *C22B 7/001* (2013.01); *C22B 26/12* (2013.01)

(58) Field of Classification Search
CPC ...... C22B 26/12; H01M 10/54; H01M 10/052
See application file for complete search history.

(56) References Cited

U.S. PATENT DOCUMENTS

| | | | | |
|---|---|---|---|---|
| 2011/0073022 A1* | 3/2011 | Maryamchik | ........... | F23C 10/20 |
| | | | | 110/297 |
| 2015/0052739 A1* | 2/2015 | Deb | ...................... | H01M 4/525 |
| | | | | 29/623.5 |
| 2018/0361338 A1* | 12/2018 | Chen | ................... | H01M 4/0471 |

FOREIGN PATENT DOCUMENTS

| | | |
|---|---|---|
| EP | 0 567 264 A1 | 10/1993 |
| EP | 0 824 115 A1 | 2/1998 |
| EP | 3 576 216 A1 | 12/2019 |
| EP | 4 074 413 A1 | 10/2022 |
| JP | S64-79586 A | 3/1989 |
| JP | H11-209811 A | 8/1999 |

(Continued)

OTHER PUBLICATIONS

European Search Report For EP21757652.9 issued on Apr. 19, 2023 from European patent office in a counterpart European patent application.

(Continued)

*Primary Examiner* — Anthony J Zimmer
*Assistant Examiner* — Eric Scott Sherman
(74) *Attorney, Agent, or Firm* — The PL Law Group, PLLC

(57) ABSTRACT

In a method for recovering an active metal of a lithium secondary battery according to an embodiment, a waste cathode active material mixture is prepared from a waste cathode of a lithium secondary battery. A preliminary precursor mixture is formed by reacting the waste cathode active material mixture with a reactive gas in a fluidized bed reactor. The preliminary precursor mixture is cooled by spraying different first and second refrigerants to the preliminary precursor mixture. A lithium precursor is recovered from the cooled preliminary precursor mixture.

11 Claims, 2 Drawing Sheets

(56) References Cited

FOREIGN PATENT DOCUMENTS

| | | | |
|---|---|---|---|
| JP | 2003-042417 | A | 2/2003 |
| JP | 2006-511326 | A | 4/2006 |
| JP | 2012-186150 | A | 9/2012 |
| JP | 2012-229481 | A | 11/2012 |
| KR | 10-0873574 | B1 | 12/2008 |
| KR | 10-2014-0126943 | A | 11/2014 |
| KR | 10-1651315 | B1 | 8/2016 |
| KR | 10-1897134 | B1 | 9/2018 |
| KR | 10-1975661 | B1 | 5/2019 |
| KR | 10-1998691 | B1 | 7/2019 |
| KR | 10-2020238 | B1 | 9/2019 |
| KR | 10-2021-0083601 | A | 7/2021 |
| WO | WO 00/69552 | A1 | 11/2000 |
| WO | WO 2007/129845 | A1 | 11/2007 |

OTHER PUBLICATIONS

International Search Report for PCT/KR2021/002027 mailed on May 28, 2021.

European Search Report For EP21757652.9 issued on Aug. 2, 2023 from European patent office in a counterpart European patent application.

Office action issued on Jan. 28, 2025 from Japan Intellectual Property Office in a counterpart Japanese Patent Application No. 2022-549436 (all the cited references are listed in this IDS.) (English translation is also submitted herewith.).

* cited by examiner

FLUIDIZED BED REACTOR AND METHOD FOR RECOVERING ACTIVE METAL OF LITHIUM SECONDARY BATTERY USING SAME

CROSS REFERENCE TO RELATED APPLICATIONS AND CLAIM OF PRIORITY

The present application is a continuation application to International Application No. PCT/KR2021/002027 with an International Filing Date of Feb. 17, 2021, which claims the benefit of Korean Patent Application No. 10-2020-0019892 filed on Feb. 18, 2020, the disclosures of which are incorporated by reference herein in their entirety.

BACKGROUND

1. Field

The present invention relates to a fluidized bed reactor and a method of recovering an active metal of a lithium secondary battery using the same. More particularly, the present invention relates to a fluidized bed reactor including a dispersion plate and a method for recovering an active metal of a lithium secondary battery using the same.

2. Description of the Related Art

Recently, a secondary battery has been widely employed as a power source of a mobile electronic device such as a camcorder, a mobile phone, a laptop computer, etc., and a vehicle such as an electric vehicle, a hybrid vehicle, etc. A lithium secondary battery is highlighted among the secondary battery due to advantages such as high operational voltage and energy density per unit weight, a high charging rate, a compact dimension, etc.

A lithium metal oxide may be used as an active material for a cathode of the lithium secondary battery. The lithium metal oxide may further contain a transition metal such as nickel, cobalt, manganese, etc.

As the above-mentioned high-cost valuable metals are used for the cathode active material, 20% or more of a production manufacturing cost is required for manufacturing the cathode material. Additionally, as environment protection issues have recently been highlighted, a recycling method of the cathode active material is being researched.

Conventionally, a method of sequentially recovering the valuable metals by leaching a waste cathode active material in a strong acid such as sulfuric acid has been used, but the wet process may be disadvantageous in aspect of a regeneration selectivity and a regeneration time, and may cause environmental pollution. Therefore, a method for recovering the valuable metals using a dry-based reaction through a contact with a reactive gas is being researched.

However, as a size of the active material particles supplied for a dry reaction becomes decreased, a non-uniform reaction may occur due to an aggregation. Further, a recovery ratio of the active material may be reduced due to a local non-uniform supply of a reactive gas in a reactor.

For example, Korean Registered Patent Publication No. 10-0709268 discloses an apparatus and a method for recycling a waste manganese battery and an alkaline battery, but does not provide a dry-based method for regenerating valuable metals with high selectivity and high yield.

SUMMARY

According to an aspect of the present invention, there is provided a fluidized bed reactor providing an improved recovery efficiency.

According to an aspect of the present invention, there is provided a method of recovering an active metal of a lithium secondary battery with an improved recovery efficiency.

In a method for recovering an active metal of a lithium secondary battery according to embodiments of the present invention, a waste cathode active material mixture is prepared from a waste cathode of a lithium secondary battery. A preliminary precursor mixture is formed by reacting the waste cathode active material mixture with a reactive gas in a fluidized bed reactor. The preliminary precursor mixture is cooled by spraying different first and second refrigerants to the preliminary precursor mixture. A lithium precursor is selectively recovered from the cooled preliminary precursor mixture.

In some embodiments, the first refrigerant may be a gas, and the second refrigerant may be a liquid.

In some embodiments, the first refrigerant comprises may include nitrogen or argon.

In some embodiments, the second refrigerant may include water.

In some embodiments, an injection rate ratio of the first refrigerant relative to the second refrigerant may be from 0.1 to 10.

In some embodiments, the cooling the preliminary precursor mixture may reduce a temperature of the preliminary precursor mixture to 100° C. or less.

In some embodiments, the fluidized bed reactor may include a reactor body and a dispersion plate coupled to a bottom portion of the reactor body. The dispersion plate may include a base plate, and an injection column and an auxiliary column protruding from a top surface of the base plate. In the cooling the preliminary precursor mixture, the first refrigerant may be injected through the injection column and the second refrigerant may be injected through the auxiliary column.

In some embodiments, the first refrigerant and the second refrigerant may be injected together through the auxiliary column.

In some embodiments, the reactive gas including a reductive gas may be supplied through the injection column.

In some embodiments, the fluidized bed reactor may further include a first flow path and a second flow path for supplying the first refrigerant and the second refrigerant, respectively, from a lower portion of the fluidized bed reactor.

In some embodiments, the first flow path may be connected to the injection column, and the second flow path may be connected to the auxiliary column.

A fluidized bed reactor according to exemplary embodiments includes a reactor body; a dispersion plate coupled to a bottom portion of the reactor body and including a base plate and an injection column and an auxiliary column protruding from a top surface of the base plate; a first flow path for supplying a gaseous first refrigerant from a lower portion of the reactor to the injection column; and a second flow path for supplying a second refrigerant in a liquid state from the lower portion of the reactor to the auxiliary column.

In some embodiments, the second flow path may include a first inlet through which the first refrigerant is supplied and a second inlet through which the second refrigerant is supplied.

In some embodiments, the injection column and the auxiliary column may be arranged in a constant pitch or a constant lattice shape.

In some embodiments, a ratio of the number of the injection column relative to the number of the auxiliary column may be from 1 to 1000.

According to the above-described exemplary embodiments, a first refrigerant of a gaseous state and a second refrigerant of a liquid state may be sprayed to a preliminary precursor mixture formed in a fluidized bed reactor so that the preliminary precursor mixture may be rapidly cooled. Thus, a recovery efficiency of a lithium precursor may be improved.

In a method of recovering an active metal of a lithium secondary battery according to exemplary embodiments, an injection rate ratio of the first refrigerant and the second refrigerant may be adjusted. Thus, damages to the fluidized bed reactor due to rapid cooling of the preliminary precursor mixture may be minimized. Additionally, an amount of the second refrigerant accumulated in a lower portion of the fluidized bed reactor may be minimized, so that a subsequent process may be more quickly performed.

DETAILED DESCRIPTION OF THE EMBODIMENTS

Embodiments of the present invention provide a high-purity, high-yield method of recovering an active metal from a lithium secondary battery using a first refrigerant of a gaseous state and a second refrigerant of a liquid state. Further, a fluidized reactor capable of being used in the method of recovering an active metal of a lithium secondary battery is also provided.

Hereinafter, embodiments of the present invention will be described in detail with reference to the accompanying drawings. However, the embodiments are provided as examples and the present invention is not limited to the specific embodiments described herein.

As used herein, the term "precursor" is used to comprehensively refer to a compound including a specific metal to provide the specific metal included in an electrode active material.

Figure 1:
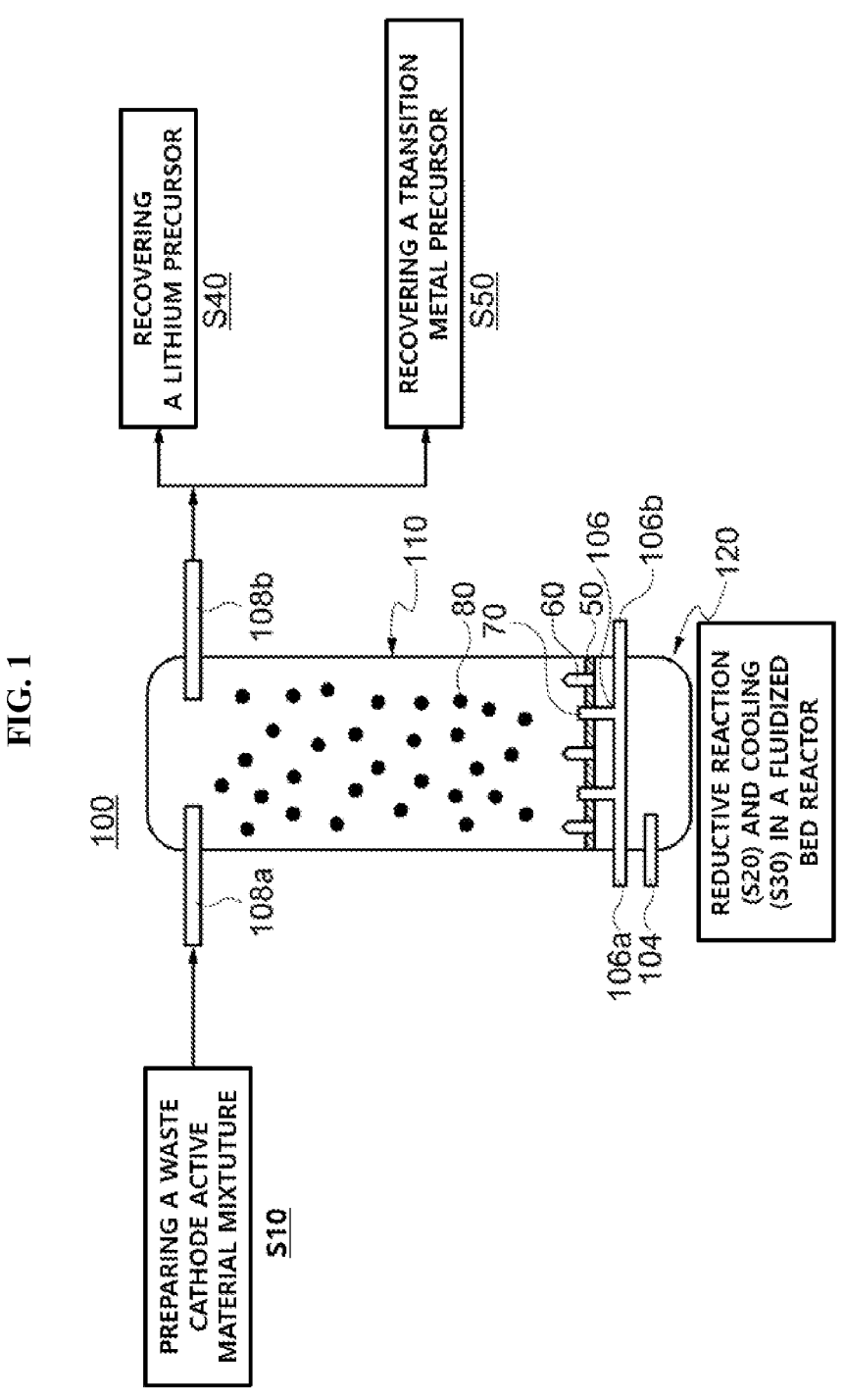
FIG. 1 is a schematic diagram for describing a fluidized bed reactor and a method of recovering an active metal of a lithium secondary battery utilizing the same in accordance with exemplary embodiments.

Referring to FIG. 1, a waste cathode active material mixture may be prepared from a waste cathode of a lithium secondary battery (e.g., in a process of S10).

The lithium secondary battery may include an electrode assembly including a cathode, an anode, and a separation layer interposed between the cathode and the anode. The cathode and the anode may include a cathode active material layer and an anode active material layer coated on a cathode current collector and an anode current collector, respectively.

For example, the cathode active material included in the cathode active material layer may include an oxide containing lithium and a transition metal.

In some embodiments, the cathode active material may include a compound represented by Formula 1 below.

$$Li_xM1_aM2_bM3_cO_y \qquad \text{[Chemical Formula 1]}$$

In Chemical Formula 1, M1, M2 and M3 may each be an element selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0 < x \le 1.1$, $2 \le y \le 2.02$, $0 < a < 1$, $0 < b < 1$, $0 < c < 1$, and $0 < a+b+c \le 1$.

In some embodiments, the cathode active material may be an NCM-based lithium oxide including nickel, cobalt and manganese.

The waste cathode may be recovered by separating the cathode from the waste lithium secondary battery. The waste cathode may include the cathode current collector (e.g., aluminum (Al)) and the cathode active material layer as described above, and the cathode active material layer may include a conductive material and a binder together with the cathode active material as described above.

The conductive material may include, e.g., a carbon-based material such as graphite, carbon black, graphene and carbon nanotube. The binder may include a resin material, e.g., vinylidenefluoride-hexafluoropropylene copolymer (PVDF-co-HFP), polyvinylidenefluoride (PVDF), polyacrylonitrile, polymethylmethacrylate, etc.

In exemplary embodiments, the recovered waste cathode may be pulverized to produce a waste cathode active material mixture. Accordingly, the waste cathode active material mixture may be prepared in a powder form. As described above, the waste cathode active material mixture may include a powder of the lithium-transition metal oxide, e.g., a powder of the NCM-based lithium oxide (e.g., Li(NCM) $O_2$).

The term "waste cathode active material mixture" used in the present application may refer to a raw material that is input to a fluidized bed reaction treatment to be described later after the cathode current collector is substantially removed from the waste cathode.

In an embodiment, the waste cathode active material mixture may include cathode active material particles such as the NCM-based lithium oxide. In an embodiment, the waste cathode active material mixture may include portions of components derived from the binder or the conductive material. In an embodiment, the waste cathode active material mixture may substantially consist of the cathode active material particles.

In some embodiments, an average particle diameter (D50) (e.g., a particle diameter at 50% of a volume fraction in a cumulative particle size distribution) of the waste cathode active material mixture may be from 5 to 100 μm. Within the above range, a lithium-transition metal oxide such as Li(NCM)$O_2$ to be recovered may be easily separated from the cathode current collector, the conductive material and the binder included in the waste cathode active material mixture.

In some embodiments, the waste cathode active material mixture may be heat-treated before being input into a fluidized bed reactor to be described later. Impurities such as the conductive material and the binder included in the waste cathode active material mixture may be substantially removed or reduced by the heat treatment, so that the lithium-transition metal oxide may be introduced into the fluidized bed reactor with high purity.

A temperature of the heat treatment temperature may be, e.g., from about 100 to 500° C., preferably from about 350 to 450° C. Within the above range, the impurities may be substantially removed while preventing decomposition and damages of the lithium-transition metal oxide.

For example, in a process of S20, the waste cathode active material mixture may be reacted in a fluidized bed reactor 100 to form a preliminary precursor mixture 80.

As illustrated in FIG. 1, the fluidized bed reactor 100 may be divided into a reactor body 110, a lower reactor portion 120. The reactor body 110 may include or may be integrated with a heating tool such as a heater.

The dispersion plate described above may be coupled to a bottom portion of the reactor body 110. Accordingly, a portion under the dispersion plate of the reactor body 110 may be defined as the lower reactor portion 120.

The waste cathode active material mixture may be supplied into the reactor body 110 through a supply flow path 108*a*. The waste cathode active material mixture may be dropped through the supply flow path 108*a* connected to an upper portion of the reactor body 110. The waste cathode active material mixture may be introduced through a supply flow path (not illustrated) to the bottom portion of the reactor body 110.

A reactive gas for converting the waste cathode active material mixture into a preliminary precursor may be supplied into the reactor body 110 through a first flow path 104 connected to the lower reactor portion 120. In exemplary embodiments, the reactive gas may include a reductive gas, and may include, e.g., hydrogen ($H_2$).

The reactive gas may be discharged into the reactor body 110 through an injection column 60 included in the dispersion plate. The reactive gas may be supplied from the bottom portion of the fluidized bed reactor 100 to be in contact with the waste cathode active material mixture, so that the waste cathode active material mixture may react with the reactive gas while moving to an upper portion of the reactor to be converted into the preliminary precursor.

In some embodiments, the lithium-transition metal oxide may be reduced by the reductive gas to generate a preliminary lithium precursor including, e.g., lithium hydroxide (LiOH), lithium oxide (e.g., $Li_2O$), and a transition metal or a transition metal oxide. For example, Ni, Co, NiO, CoO and MnO may be produced together with the preliminary lithium precursor by the reductive reaction.

The reductive reaction in the reactor body 110 may be performed at a temperature from about 400 to 700° C., preferably from 450 to 550° C. Within the reaction temperature range, the reductive reaction may be promoted without causing re-aggregation and recombination of the preliminary lithium precursor and the transition metal/transition metal oxide.

In some embodiments, a carrier gas may be supplied together with the reactive gas from the lower reactor portion 120. For example, the carrier gas may be supplied together with the reactive gas through the first flow path 104.

For example, the carrier gas may include an inert gas such as nitrogen ($N_2$) or argon (Ar). The carrier gas may also be discharged and supplied through the injection columns 60 of the dispersion plate to promote the fluidized bed formation. For example, a cyclone formation through the carrier gas may be promoted.

The preliminary precursor mixture 80 including the preliminary lithium precursor and a preliminary transition metal precursor (e.g., the transition metal or the transition metal oxide) may be formed in the reactor body 110.

The preliminary lithium precursor may include, e.g., lithium hydroxide, lithium oxide and/or lithium carbonate.

For example, in a process of S30, the preliminary precursor mixture 80 may be cooled using a first refrigerant and a second refrigerant.

In exemplary embodiments, the first refrigerant may be a gas, and the second refrigerant may be a liquid. When the first refrigerant and the second refrigerant have different phases, the preliminary precursor mixture 80 may be more effectively cooled by adjusting a content ratio of the liquid having a fast-cooling rate and the gas having a relatively slow cooling rate.

For example, the first refrigerant may include an inert gas. For example, the first refrigerant may include nitrogen or argon. For example, the first refrigerant may gradually cool the preliminary precursor mixture 80, thereby suppressing damages to the fluidized bed reactor 100 due to a rapid cooling of the preliminary precursor mixture 80.

For example, the second refrigerant may include water. For example, the second refrigerant may be sprayed to the preliminary precursor mixture 80 in a form of mist to assist the cooling by the first refrigerant. Accordingly, a cooling rate of the preliminary precursor mixture 80 may be more improved compared to a cooling rate when the first refrigerant is used alone. Additionally, the second refrigerant may be used together with the gaseous first refrigerant as an auxiliary refrigerant, so that damages to the fluidized bed reactor 100 due to a rapid cooling may be suppressed.

For example, the first refrigerant may be injected as a main refrigerant to the preliminary precursor mixture 80, and the second refrigerant may be injected as an auxiliary refrigerant to the preliminary precursor mixture 80. Accordingly, a cooling efficiency may be appropriately improved while preventing the damages of the fluidized bed reactor 100.

For example, an injection rate ratio (e.g., a flow rate ratio) of the first refrigerant relative to the second refrigerant may be in a range from about 0.1 to 10. Within the range of the injection rate ratio, the cooling rate of the preliminary precursor mixture 80 may be improved, and an accumulation of the second refrigerant in the liquid state in a lower portion of the fluidized bed reactor 100 may be prevented.

In some exemplary embodiments, the first refrigerant and the second refrigerant may be sprayed so that the preliminary precursor mixture 80 may be cooled to about 100° C. or less. More preferably, the preliminary precursor mixture 80 may be cooled to about 50 to 100° C. When the preliminary precursor mixture 80 is cooled to the above temperature range, a recovery efficiency of the lithium precursor may be improved when recovering the lithium precursor, which will be described later.

Figure 2:
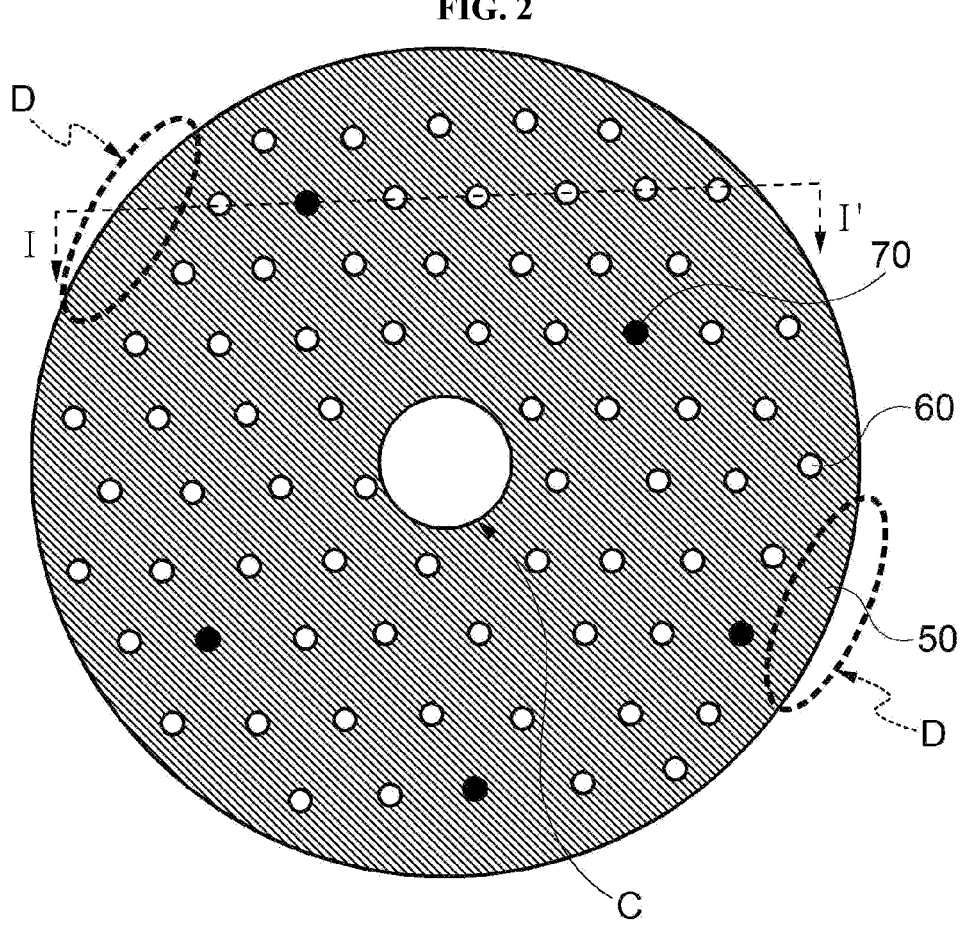
FIG. 2 is a schematic top plan view illustrating a dispersion plate of a fluidized bed reactor in accordance with exemplary embodiments.
Figure 3:
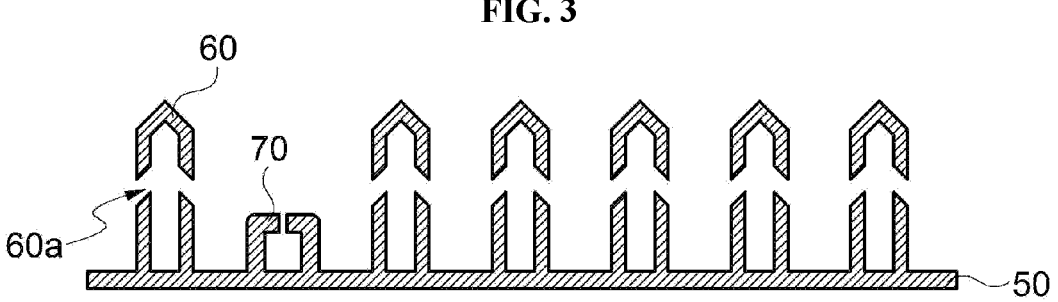
FIG. 3 is a schematic cross-sectional view illustrating constructions of an injection column and an auxiliary column of a dispersion plate in accordance with exemplary embodiments.

FIG. 2 is a schematic top plan view illustrating a dispersion plate of a fluidized bed reactor in accordance with exemplary embodiments. FIG. 3 is a schematic cross-sectional view illustrating constructions of injection columns of a dispersion plate in accordance with exemplary embodiments. For example, FIG. 3 is a cross-sectional view taken along line I-I- of FIG. 2.

Referring to FIGS. 2 and 3, the dispersion plate may include a base plate 50 and a plurality of injection columns 60 and auxiliary columns 70 protruding from the base plate 50.

For example, the injection column 60 may inject the first refrigerant, and the auxiliary column 70 may inject the second refrigerant. For example, the auxiliary column 70 may spray the first refrigerant and the second refrigerant together.

The base plate 50 may be, e.g., a circular or polygonal plate formed of a metal or a ceramic material.

The injection columns 60 and the auxiliary columns 70 may have a shape protruding from a top surface of the base plate 50. The injection column 60 and the auxiliary column 70 may be arranged on the top surface of the base plate 50 with a regular arrangement (e.g., a constant grid arrangement) and an arrangement pitch for uniform diffusion and distribution of the reactive gas.

For example, the injection columns 60 and the auxiliary columns 70 may have an array shape or a grid shape arranged at vertices of a polygon such as a triangle, a tetragon or a hexagon. For example, the injection columns 60 and the auxiliary columns 70 may be appropriately positioned to reduce an area where the injection columns 60 are not formed at a periphery of the base plate 50 (e.g., a dead zone D). As illustrated in FIG. 2, the injection columns 60 may be arranged according to, e.g., an equilateral triangle pitch.

A supporting unit of the dispersion plate may be coupled to a central portion (C) of the dispersion plate illustrated in FIG. 2. In an embodiment, e.g., the injection column 60 may also be disposed in the central portion C, and the auxiliary column 70 may also be arranged together.

For example, the injection column 60 may include a column body and a cap portion. For example, the injection column 60 may have a bubble cap or a tuyere structure. For example, the injection column 60 may include an injection hole 60a penetrating through the column body.

In an embodiment, an inclination angle between a vertical direction from the top surface of the base plate 50 and the injection hole may be from about 30 to 60°.

For example, the injection hole may be formed to be inclined with respect to the top surface of the base plate 50, so that the reactive gas may be sprayed to be diffused in the direction of the base plate 50. Accordingly, reaction materials (e.g., precursor particles or active material particles) that settles on the top surface of the base plate 50 may rise so that the formation of the fluidized bed may be promoted.

For example, the auxiliary column 70 may include a mist spray. In this case, the first refrigerant or the second refrigerant may be sprayed in the form of mist, so that the cooling efficiency of the preliminary precursor mixture 80 may be improved.

In some exemplary embodiments, a ratio of the number of the injection columns 60 relative to the number of the auxiliary columns 70 formed on the base plate 50 may be 1 to 1000, e.g., 10 to 100. For example, within the number ratio, a ratio of the first refrigerant and the second refrigerant injected per unit time may be easily adjusted so that the cooling rate of the preliminary precursor mixture 80 may be efficiently controlled.

In some exemplary embodiments, the fluidized bed reactor 100 may further include a second flow path 106 for supplying the first refrigerant or the second refrigerant from the lower reactor portion 120.

For example, the first flow path 104 may be connected to the injection column 60, and the second flow path 106 may be connected to the auxiliary column 70. For example, the first refrigerant may be supplied to the lower reactor portion 120 through the first flow path 104 to be injected into the reactor body 110 through the injection column 60. For example, the first refrigerant or the second refrigerant may be supplied through the second flow path 106 to be injected into the reactor body 110 through the auxiliary column 70.

For example, the second flow path 106 may include a first inlet 106a through which the first refrigerant may be supplied and a second inlet 106b through which the second refrigerant may be supplied.

For example, the first refrigerant and the second refrigerant may be simultaneously injected into the first refrigerant inlet 106a and the second refrigerant inlet 106b, respectively. In this case, the first refrigerant and the second refrigerant may be simultaneously injected to the preliminary precursor mixture 80 positioned at an inside of the reactor body 110 through the auxiliary column 70.

In some exemplary embodiments, the second flow path 106 may further include an injection control unit for controlling the injection of the first refrigerant and the second refrigerant. For example, the supply of the first refrigerant may be blocked by the injection control unit. In this case, the second refrigerant may only be supplied to the auxiliary column 70. For example, the supply of the second refrigerant may be blocked by the injection control unit. In this case, the first refrigerant may only be supplied to the auxiliary column 70.

A lithium precursor may be selectively recovered from the cooled preliminary precursor mixture 80 (e.g., in a process of S40).

In some embodiments, the cooled preliminary lithium precursor mixture 80 may be washed with water to recover a preliminary lithium precursor. The preliminary lithium precursor particles in the form of lithium hydroxide (LiOH) may be substantially dissolved in water by the washing treatment, separated from the transition metal precursor, and recovered in advance. The lithium precursor substantially consisting of lithium hydroxide may be obtained through a crystallization process, etc., of lithium hydroxide dissolved in water.

In an embodiment, the preliminary lithium precursor in the form of lithium oxide and lithium carbonate may be substantially removed through the washing treatment. In an embodiment, the preliminary lithium precursor particles in the form of lithium oxide and lithium carbonate may be at least partially converted into lithium hydroxide through the washing treatment.

In some embodiments, the preliminary lithium precursor may be reacted with a carbon-containing gas such as carbon monoxide (CO), carbon dioxide ($CO_2$), etc., to obtain lithium carbonate (e.g., $Li_2CO_3$) as the lithium precursor. A crystallized lithium precursor may be obtained through the reaction with the carbon-containing gas. For example, lithium carbonate may be collected by injecting the carbon-containing gas together during the washing treatment.

In some embodiments, a transition metal precursor may be obtained from the collected preliminary transition metal precursor (e.g., in a process of S50).

For example, the preliminary lithium precursor may be collected through an outlet 108b, and then the preliminary transition metal precursor may be recovered. Thereafter, the preliminary transition metal precursor may be treated with an acid solution to form precursors in the form of acid salts of each transition metal.

In an embodiment, sulfuric acid may be used as the acid solution. In this case, $NiSO_4$, $MnSO_4$ and $CoSO_4$ may each be recovered as the transition metal precursor.

As described above, the preliminary precursor mixture 80 may be formed by a dry-based process, and then the lithium precursor and the transition metal precursors may be selectively extracted by the washing and the acid solution treating, respectively. Thus, purity and selectivity of each metal precursor may be improved, and a load of the wet process may be reduced, and amount of wastewater and by-products may also be reduced.

What is claimed is:

1. A method for recovering an active metal of a lithium secondary battery, the method comprising:
    preparing a waste cathode active material mixture from a waste cathode of a lithium secondary battery;
    forming a preliminary precursor mixture by reacting the waste cathode active material mixture with a reactive gas in a fluidized bed reactor;

cooling the preliminary precursor mixture by spraying different first refrigerant and second refrigerant to the preliminary precursor mixture in the fluidized bed reactor, wherein the first and second refrigerants have different phases; and selectively recovering a lithium precursor from the cooled preliminary precursor mixture.

2. The method for recovering an active metal of a lithium secondary battery of claim 1, wherein the first refrigerant is a gas, and the second refrigerant is a liquid.

3. The method for recovering an active metal of a lithium secondary battery of claim 1, wherein the first refrigerant comprises nitrogen or argon.

4. The method for recovering an active metal of a lithium secondary battery of claim 1, wherein the second refrigerant comprises water.

5. The method for recovering an active metal of a lithium secondary battery of claim 1, wherein an injection rate ratio of the first refrigerant relative to the second refrigerant is from 0.1 to 10.

6. The method for recovering an active metal of a lithium secondary battery of claim 1, wherein the cooling the preliminary precursor mixture reduces a temperature of the preliminary precursor mixture to 100° C. or less.

7. The method for recovering an active metal of a lithium secondary battery of claim 1, wherein the fluidized bed reactor comprises:

a reactor body; and a dispersion plate coupled to a bottom portion of the reactor body, the dispersion plate comprising a base plate; and an injection column and an auxiliary column protruding from a top surface of the base plate, wherein the cooling of the preliminary precursor mixture comprises injecting the first refrigerant through the injection column and injecting the second refrigerant through the auxiliary column.

8. The method for recovering an active metal of a lithium secondary battery of claim 7, wherein, in addition to injecting the first refrigerant through the injection column and the second refrigerant through the auxiliary column, the auxiliary column is configured to co-inject the first refrigerant and the second refrigerant into the reactor body.

9. The method for recovering an active metal of a lithium secondary battery of claim 7, wherein the forming the preliminary precursor mixture comprises supplying the reactive gas including a reductive gas through the injection column.

10. The method for recovering an active metal of a lithium secondary battery of claim 7, wherein the fluidized bed reactor further comprises a first flow path and a second flow path for supplying the first refrigerant and the second refrigerant, respectively, from a lower portion of the fluidized bed reactor.

11. The method for recovering an active metal of a lithium secondary battery of claim 10, wherein the first flow path is connected to the injection column, and the second flow path is connected to the auxiliary column.

\* \* \* \* \*